United States Patent
Venkata Naga Ravi

(10) Patent No.: US 9,411,562 B2
(45) Date of Patent: Aug. 9, 2016

(54) INTER-APPLICATION TRANSFORM BUILDER FOR CLOUD APPLICATIONS

(71) Applicant: Oracle International Corporation, Redwood Shores, CA (US)

(72) Inventor: Kiran Vedula Venkata Naga Ravi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/971,010

(22) Filed: Aug. 20, 2013

(65) Prior Publication Data

US 2015/0058833 A1 Feb. 26, 2015

(51) Int. Cl.
G06F 9/44 (2006.01)
G06F 9/45 (2006.01)
G06F 9/445 (2006.01)

(52) U.S. Cl.
CPC .. *G06F 8/40* (2013.01); *G06F 8/43* (2013.01); *G06F 8/45* (2013.01); *G06F 8/65* (2013.01); *G06F 9/44526* (2013.01)

(58) Field of Classification Search
CPC .............................................. G06F 8/10–8/77
See application file for complete search history.

(56) References Cited

U.S. PATENT DOCUMENTS

| | | | | |
|---|---|---|---|---|
| 6,442,748 B1* | 8/2002 | Bowman-Amuah | ...... | G06F 8/20 717/108 |
| 6,601,234 B1* | 7/2003 | Bowman-Amuah | ...... | G06F 8/24 717/108 |
| 8,019,579 B1* | 9/2011 | Wey | ...... | G06F 9/4443 703/6 |
| 8,296,763 B1 | 10/2012 | Peercy et al. | | |
| 8,341,269 B2 | 12/2012 | Balani et al. | | |
| 2006/0053407 A1* | 3/2006 | Kodosky | ................... | G06F 8/34 717/105 |
| 2006/0075382 A1* | 4/2006 | Shaburov | ...................... | 717/106 |
| 2006/0143570 A1* | 6/2006 | Washington et al. | ......... | 715/763 |
| 2006/0225034 A1* | 10/2006 | Peck | ......................... | G06F 8/34 717/106 |
| 2006/0228654 A1* | 10/2006 | Sanjar | ...................... | G06F 8/34 430/438 |

(Continued)

OTHER PUBLICATIONS

Cretella, Giuseppina, et al., Towards Automatic Analysis of Cloud Vendors APIs for Supporting Cloud Application Portability, 2012, pp. 61-67.*

(Continued)

*Primary Examiner* — Thuy Dao
*Assistant Examiner* — Christopher Franco
(74) *Attorney, Agent, or Firm* — Vista IP Law Group, LLP; Peter Mei

(57) ABSTRACT

A method, system, and computer program product for customization of flows between software applications. A system implementation commences by associating a first application with a first graphical object descriptor, and by associating a second application with a second graphical object descriptor. A graphical user interface such as an integrated development environment is used to drag/drop the graphical object descriptors and other graphical objects to form logical connections between the first graphical object descriptor and the second graphical object descriptor. The installation of an application is modified (e.g., using a patch), which modification is performed based at least in part on the logical connections. The logical connections between the applications handles inter-application communication such that upon executing the modified first application at least some outputs from the modified first application are processed using the logical connection to produce modified first application results which are in turn received by the second application.

20 Claims, 8 Drawing Sheets

(56) References Cited

U.S. PATENT DOCUMENTS

| | | | | |
|---|---|---|---|---|
| 2006/0230314 | A1* | 10/2006 | Sanjar | G06F 8/61 714/26 |
| 2006/0259871 | A1* | 11/2006 | Washington et al. | 715/763 |
| 2008/0034314 | A1* | 2/2008 | Louch | G06F 8/60 715/778 |
| 2008/0092109 | A1* | 4/2008 | Kinnucan | G06F 8/10 717/105 |
| 2008/0209392 | A1* | 8/2008 | Able et al. | 717/105 |
| 2008/0307388 | A1* | 12/2008 | Ralls et al. | 717/115 |
| 2009/0106011 | A1* | 4/2009 | Chen | G06F 8/10 703/17 |
| 2009/0199175 | A1* | 8/2009 | Keller et al. | 717/178 |
| 2009/0228864 | A1* | 9/2009 | Washington | G06F 8/34 717/105 |
| 2009/0259972 | A1* | 10/2009 | Kodosky et al. | 715/810 |
| 2010/0332617 | A1 | 12/2010 | Goodwin et al. | |
| 2011/0022939 | A1* | 1/2011 | Egilsson | G06F 8/34 715/219 |
| 2011/0153727 | A1 | 6/2011 | Li | |
| 2012/0084695 | A1* | 4/2012 | Higgins et al. | 715/771 |
| 2012/0084750 | A1* | 4/2012 | Hardy | G06F 8/24 717/115 |
| 2012/0283017 | A1 | 11/2012 | Ahiska et al. | |
| 2012/0311012 | A1 | 12/2012 | Mazhar et al. | |
| 2013/0074034 | A1* | 3/2013 | Allen | G06F 8/20 717/109 |
| 2014/0195582 | A1* | 7/2014 | Sherwood | H04L 67/10 709/201 |

OTHER PUBLICATIONS

Fehling, Christopher, et al., "A Collection of Patterns for Cloud Types, Cloud Service Models, and Cloud-based Application Architectures", 2011, pp. 1-61.*

Tisi, Massimo, et al., "On the Use of Higher-Order Model Transformations", 2009, pp. 18-33.*

McGachey, Phil, et al., "Classifying Java Class Transformations for Pervasive Virtualized Access", 2009, pp. 75-84.*

Jo, Jung Guen, et al., "Modified Hybrid Input-Output Algorithm for Phase Retrieval", 2012, pp. 62-64.*

Bartolini, S., et al., "An object level transformation technique to improve the performance of embedded applications", 2001, pp. 1-9.*

Sukhpal Singh et al., "Reusability Framework for Cloud Computing", International Journal of Computational Engineering Research (ijceronline.com) vol. 2, Issue 6, Oct. 2012, 9 pages url: http://arxiv.org/ftp/arxiv/papers/1210/1210.8011.pdf.

"Cisco Virtual Workspace (VXI) Smart Solution: Automation and the Cisco Intelligent Automation for Cloud Framework", 2013, 12 pages url: http://www.cisco.com/en/US/docs/solutions/Enterprise/Data_Center/VXI/VXI_ICA.pdf.

Puppet Labs, "Puppet Labs Annouces Integration with VMware vFabric Application Director", Aug. 27, 2012, 3 pages url: https://puppetlabs.com/company/news/press-releases/puppet-labs-announces-integration-with-vmware-vfabric-application-director/.

HPCloud "Enterprise Application Migration to the Cloud", Jan. 16, 2013, 3 pages url: https://www.hpcloud.com/solution/enterprise-application-migration.

Lockheed Martin, "Lockheed Martin Merges Cloud Agility with Premises Control to Meet Customer Needs", Jul. 2010, 6 pages url: http://www.lockheedmartin.com/content/dam/lockheed/data/corporate/documents/white-papers/Lockheed-Martin-Windows-Azure-CS.pdf.

Cloud Cruiser, FAQs, Jun. 17, 2012, 5 pages url: http://cloudcruiser.com/resources/faqs.html.

Citrix Systems, "NetScaler Application Delivery Controller", Oct. 2, 2012, 2 pages url: http://www.citrix.com/products/netscaler-application-delivery-controller/overview.html.

SafeNet, "Sentinel Cloud Services", 8 pages, 2013 url: http://www.safenet-inc.com/WorkArea/linkit.aspx?LinkIdentifier=id&ItemID=8589942239.

Remics, "REuse and Migration of legacy applications to Interoperable Cloud Services", Mar. 3, 2012, 3 pages url: http://www.fokus.fraunhofer.de/en/motion/projekte/laufende_projekte/REMICS/index.html.

David Linthicum, "Salesforce.com to SAP Integration", Aug. 6, 2010, 8 pages url: http://www.informaticacloud.com/images/whitepapers/WP-SAP_Salesforce_Integration_pdf.

Amazon, "Amazon Elastic Compute Cloud (Amazon EC2)", Jan. 1, 2012, 9 pages url: http://aws.amazon.com/ec2/.

Nayaki Nayyar, Discover Integration of Cloud Solutions from SAP, May 14, 2012, 16 pages.

RealCloud, Solution Brief 2. Data Center Automation and Application Mobility, 2011, 8 pages.

* cited by examiner

INTER-APPLICATION TRANSFORM BUILDER FOR CLOUD APPLICATIONS

FIELD

The disclosure relates to the field of automating customization of flows between software applications and more particularly to techniques for automating inter-application transforms used between multiple cloud-borne applications.

BACKGROUND

Cloud based application delivery has become popular. Software application offerings by vendors (including cloud vendors) span a wide spectrum of disciplines and uses. A single cloud deployment might host many diverse applications such as business applications, consumer applications, data mining applications, etc., and cloud vendors are often customer-driven to support customization of such applications. In some cases a software application provider may offer rudimentary integration between one of their application titles and another one of their application titles. For example, a "data mining tool" might write the results of a data mining operation to a database or file, and a "list maker tool" might read data from that database or file. In some cases providers pre-specify permitted (e.g., pre-tested) inter-application I/O parameters.

Many customers/users of the many diverse applications need to customize the application and/or provide add-on "customerization" of the vended applications. However, adding an add-on or other type of "customerization" to the vended applications often defeats the aforementioned offered rudimentary integration. This situation introduces several problems such as: (1) if the practices suggested by the software vendors are followed, the customers/users cannot seize full benefit of the software titles in combination; (2) even if a customer/user can seize benefit from the aforementioned offered rudimentary integration, the customers/users are at the mercy of the software vendor's release schedule; and (3) customer/users cannot easily seize benefit from integration between software titles provided by different vendors.

One legacy approach has been to employ consultants who write custom code to implement customer-specified integration between such applications. However, this approach has many drawbacks including (1) even if a customer/user can seize benefit from the custom code, the customers/users are at the mercy of changes rolled-out by the software vendors; and (2) the rate at which software vendors release code updates has increased dramatically, thus commensurately exploding the costs incurred to employ consultants to maintain custom code.

What's needed are techniques to facilitate high-function inter-application integration without requiring consultants to develop custom code and without requiring revisions to customerized (e.g., consultant-developed) code at each release of the constituent applications.

SUMMARY

The present disclosure provides an improved method, system, and computer program product suited to address the aforementioned issues with legacy approaches. More specifically, the present disclosure provides a detailed description of techniques used in methods, systems, and computer program products for an inter-application transform builder for cloud applications.

A system implementation commences by associating a first application with a first graphical object descriptor, and by associating a second application with a second graphical object descriptor. A graphical user interface such as an integrated development environment is used to drag-and-drop the graphical object descriptors and other graphical objects to form logical connections between the first graphical object descriptor and the second graphical object descriptor. The installation of an application is modified (e.g., using a patch or update), which modification is performed based at least in part on the logical connections. The logical connections between the applications handles inter-application communication such that upon executing the modified first application at least some outputs from the modified first application are processed using the logical connection to produce modified first application results which are in turn received by the second application.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
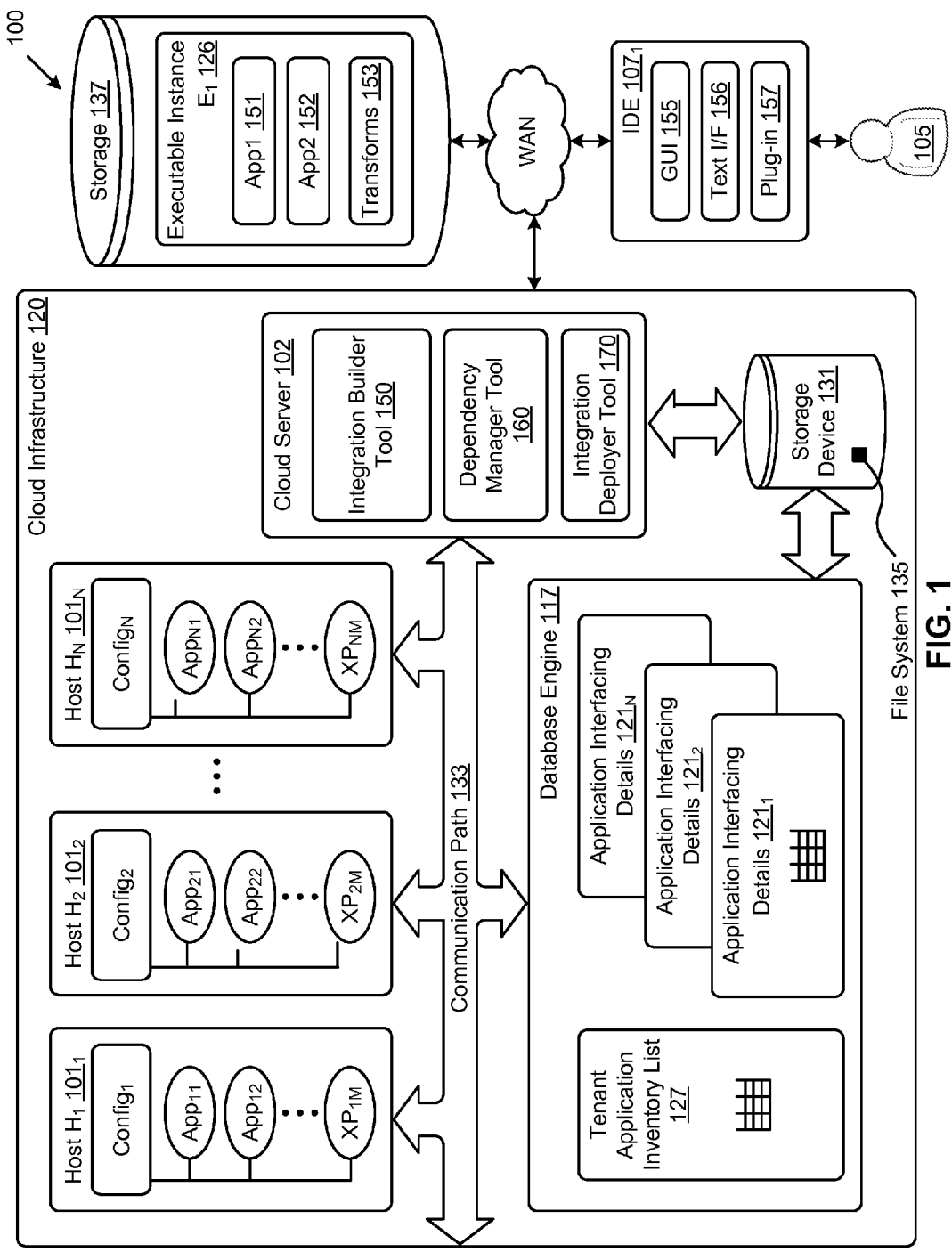
FIG. 1 is a block diagram of a cloud environment in which is implemented an inter-application transform builder for cloud applications, according to some embodiments.

Some embodiments of the present disclosure address the problem of building and maintaining inter-application transforms and some embodiments are directed to an improved approach for implementing inter-application transform builders for cloud applications. More particularly, disclosed herein and in the accompanying figures are exemplary environments, methods, and systems for implementing an inter-application transform builder for cloud applications.

Overview

Cloud-based software application offerings by vendors (including cloud vendors) span a wide spectrum of disciplines and uses. A single cloud deployment might host many diverse applications such as business applications, consumer applications, data mining applications, etc., and cloud vendors are often customer-driven to support customization of such applications. In some cases a software application provider may offer rudimentary integration between one of their application titles and another one of their application titles. For example, a "data mining tool" might write the results of a data mining operation to a database or file, and a "list maker tool" might read data from that database or file. In some cases providers pre-specify permitted (e.g., pre-tested) inter-application I/O parameters.

Many challenges are presented to users of cloud services:
The aforementioned rudimentary integration capabilities provided in legacy systems are meant to work with the base application provided by the vendor.
Often, legacy custom integrations are not supported by the cloud vendor, or for other reasons cannot be run on the cloud itself.
The costs of ongoing maintenance of legacy custom integrations are generally intended to be borne by the customer.
The acts of ongoing maintenance of legacy custom integrations are generally performed by the customer and not by the cloud provider. In some cases the cloud vendor may change an underlying application frequently, and in such cases source code level changes may demand consultant intervention and expense.
Changes in operational modes and/or platform topology may also necessitate costly changes to legacy custom integrations.
Legacy custom integration developers as well as customer-side site engineers often need to acquire a deep knowledge about the underlying software application as well as a deep knowledge about the infrastructure and platform system details.
Development and debugging of legacy custom integrations is cumbersome as all of the application runtime occurs in the cloud infrastructure.
Security and password configuration within legacy custom integrations often relies on manual intervention.

Drag-and-Drop

In some of the herein-disclosed embodiments, acts constituent to building custom applications are made available to the customer as drag-and-drop controls to the developer's integrated design environment (IDE). For example, consider a customer who has purchased a "human resources management" application (App1) and two software applications (e.g., App2 and App3) from second and third independent vendors. Strictly as an example and illustration, consider that the first application (App2) is a "talent scout" application that looks for potential candidates to match a job specification, and the second application (App3) is a general purpose scheduling application that could be used to schedule and conduct interviews.

As can be appreciated, App1 could interface with App2, and App1 could interface with App3, and App2 could interface with App3. Yet, since each of the software titles are sourced from different vendors, this scenario presents a need for multiple inter-application communication paths and related components. Even modest integration efforts might need to draw in consultants from the outset of any integration effort. Cloud vendors and customers alike are in need of techniques to facilitate high-function inter-application integration without requiring consultants to develop and maintain so many components.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 is a block diagram of a cloud environment 100 in which is implemented an inter-application transform builder for cloud applications. As an option, the present cloud environment 100 or any aspect thereof may be implemented in the context of the architecture and functionality of the embodiments described herein. Also, the cloud environment 100 or any aspect thereof may be implemented in any desired environment.

As shown, cloud infrastructure 120 comprises a plurality of computing machines (e.g., host $H_1$ $101_1$, host $H_2$ $101_2$, host $H_N$ $101_N$, etc.) configured for communication over a communication path 133 to a database engine 117 and a cloud server 102. The cloud infrastructure can be configured by an administrator and/or by a user 105. Further, a user can access and configure the cloud server 102 via a graphical user interface and/or an integrated development environment (e.g., IDE $107_1$). Such a user or an administrator might also configure (e.g., initially configure and/or maintain) storage 137, which contains an executable instance $E_1$ 126. Such an executable instance comprises an instance image copy of any number of applications (e.g., App1 151, App2 152, etc.) and an executable instance image copy of any number of transforms 153, which transforms serve to provide custom functions between applications. Storage 137 might also contain an initial copy of site information data.

Any host (e.g., host $H_1$ $101_1$, host $H_2$ $101_2$, host $H_N$ $101_N$, etc.) can host software applications, application transforms, and can execute any sorts of software processes. Any host can communicate with any other host, can communicate with the database engine, and can communicate with cloud server 102. The processes can be run on "bare metal", or can be run under an operating system or hypervisor. In exemplary embodiments, any transform (e.g., a running instance of transforms 153) that runs on a host can communicate with the cloud server 102. Various particular functions of the transforms running on each host are discussed below, in FIG. 2B, and elsewhere in this disclosure.

The database engine 117 serves as a repository for data, which data can be stored (e.g., using storage device 131) and be accessed as a relational database relation, or as a file (e.g., in a file system 135), or as a memory-resident data structure. As shown, database engine 117 comprises tenant application inventory list 127 and occurrences of application interfacing data (e.g., application interfacing details $121_1$, application interfacing details $121_2$, application interfacing details $121_N$, etc.).

In the particular embodiment of FIG. 1, any occurrences of transforms 153 can access the cloud infrastructure via communication path 133 and/or can access more distal points (e.g., over a WAN). Exemplary communication facilities serve to provide input to, and receive outputs from transforms. Such communication facilities (see conduit as introduced in FIG. 2A) can perform at least the following functions:
Receive signals from a first application,
Send signals to a second application,
Receive signals from a second application, and
Send signals to a first application.

As shown, an integration builder tool 150 serves to form an integrated development environment (e.g., IDE $107_1$), comprising a GUI 155, a text interface 156, and any number of instances of a plug-in 157. The integration builder tool 150 further cooperates with a dependency manager tool 160 and an integration deployer tool 170. The aforementioned suite of tools can be combined to implement various portions of an inter-application transform builder for cloud applications.

The communication facilities provide intra-host communication and inter-host communication by and between any host within a cloud server 102 using any protocol (e.g., HTTP, SOAP web services, REST, socket interactions, etc.). In exemplary deployments, such protocols are supported by the cloud vendor; however, it is possible that certain communications between the cloud server 102 and agents can be performed using custom protocols. In some situations, the communication facilities provide communication to/from any destination beyond the periphery of the cloud server 102 using any protocol (e.g., TCP/IP, UDP, HTTP, ATM, etc.).

The heretofore-described communication facilities provide a conduit for communication between applications. In some cases, a communication conduit is provided by a software vendor in the form of an application programming interface (API) that serves to move data in and out of a supported application. Some vendors may provide multiple applications, and may provide compatibility between such applications via an API input interface that is compatible with another application's API output interface. Using such compatible API interfaces, multiple applications can be integrated to the extent provided by the APIs. Such compatible API interfaces support a conduit-based integration flow, which is now briefly reviewed (see FIG. 2A, below) as a foundation from which to advance the discussion of the herein-disclosed transform-based integration flows.

Figure 2A:
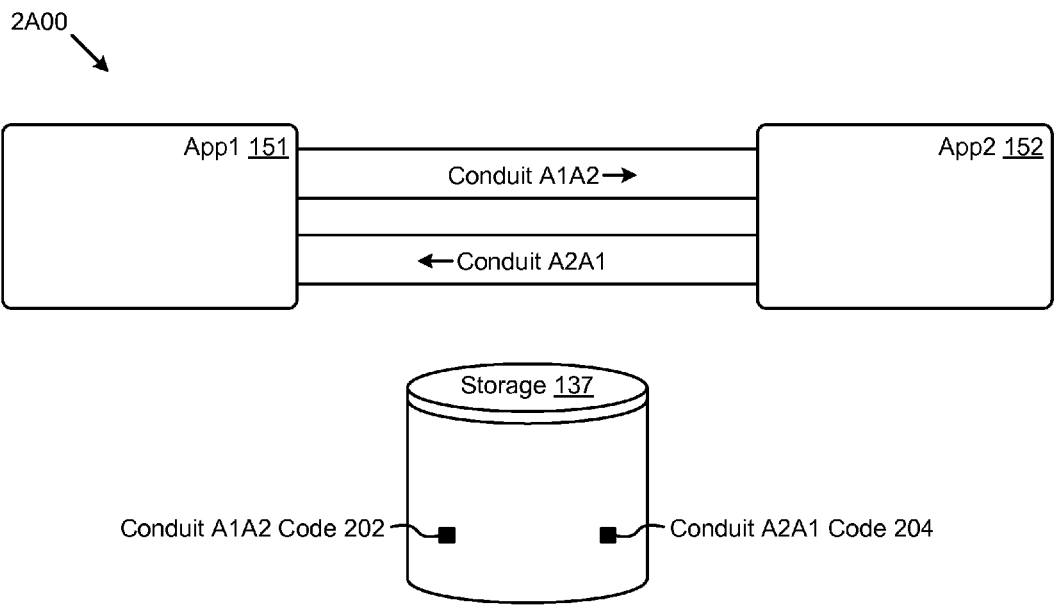
FIG. 2A is a block diagram of a conduit-based integration flow for comparisons to a transform-based inter-application transform builder for cloud applications, according to some embodiments.

FIG. 2A is a block diagram of a conduit-based integration flow 2A00 for comparisons to a transform-based inter-application transform builder for cloud applications. As an option, the present conduit-based integration flow 2A00 or any aspect thereof may be implemented in the context of the architecture and functionality of the embodiments described herein. Also, the conduit-based integration flow 2A00 or any aspect thereof may be implemented in any desired environment.

As shown, App1 151 communicates with App2 152 over a software-implemented path (e.g., conduit A1A2). And, App2 152 communicates with App1 151 over a software-implemented path (e.g., conduit A2A1). The software-implemented paths can be implemented in code, and might be stored in a file system or other storage facility (e.g., storage 137). Such code might be embodied as a routine or a class or a method, etc. and can be stored in a format accessible by an IDE. As shown, the code is stored as conduit A1A2 code 202, and as conduit A2A1 code 204.

Embodiments that follow the conduit-based integration flow of FIG. 2A can be used to integrate applications using only their input/output configurations (e.g., as provided in an API). In some cases, data output from one application might need to be manipulated before providing the manipulated data as input to a second application. In such cases a transform-based integration flow can be employed.

Figure 2B:
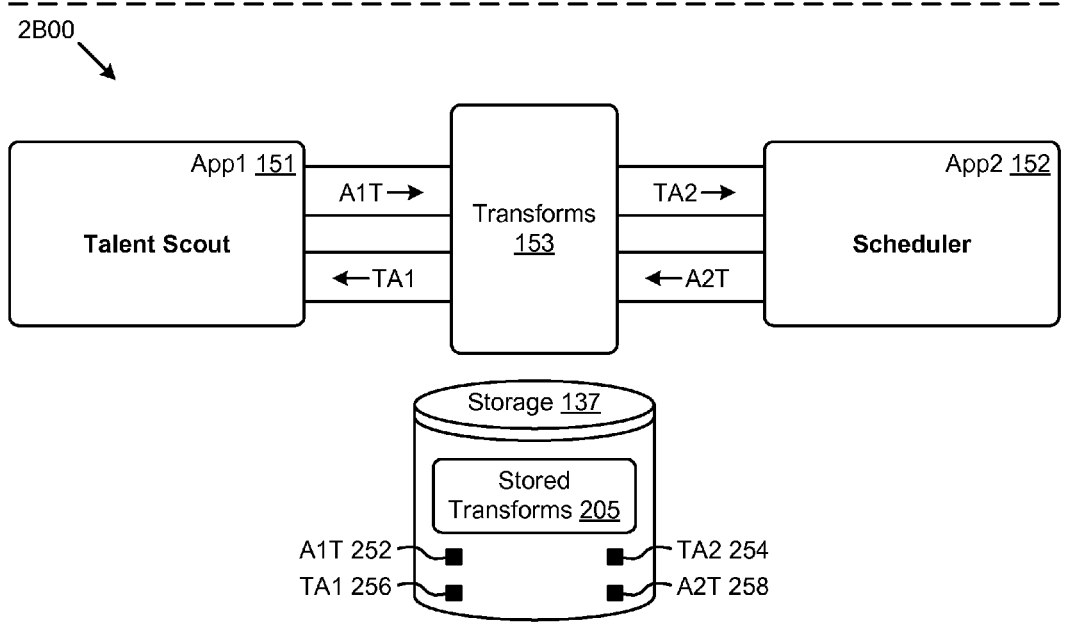
FIG. 2B is a block diagram of a transform-based integration flow as used in an inter-application transform builder for cloud applications, according to some embodiments.

FIG. 2B is a block diagram of a transform-based integration flow 2B00 as used in an inter-application transform builder for cloud applications. As an option, the present transform-based integration flow 2B00 or any aspect thereof may be implemented in the context of the architecture and functionality of the embodiments described herein. Also, the transform-based integration flow 2B00 or any aspect thereof may be implemented in any desired environment.

As shown, data from App1 "talent scout" is received by one of the transforms 153 before being sent to App2 "scheduler". The transforms 153 use metadata to customize the transformation(s). An example of such metadata is provided in Table 1, and a discussion of uses follows.

TABLE 1

Sample metadata for 'Talent Scout'

| Line No. | Sample Metadata |
|---|---|
| 1 | <CustomApp> |
| 2 |   <Name>Talent Scout</Name> |
| 3 |   <Vendor> Acme.com </Vendor> |
| 4 |   <Version> 2.4 </Version> |
| 5 |   <Protocols> |
| 6 |     <Protocol > Web Service </Protocol> |
| 7 |     <Protocol> REST </Protocol> |
| 8 |     <Protocol> UNIX-SCRIPT-CMDLINE </Protocol> |
| 9 |   </Protocols> |
| 10 |   <APIList> |
| 11 |     <API> |
| 12 |       <SearchCandidates> <!-XML Schema of the API --> </SearchCandidates> |
| 13 |     </API> |
| 14 |     <API> |
| 15 |       <GetCandidateDetails> <!-XML Schema of the API --> </GetCandidateDetails > |
| 16 |     </API> |
| 17 |   </APIList> |
| 18 | </CustomApp> |

As shown in Table 1, the CustomApp element provides metadata pertaining to APIs (e.g., see lines 10 through 17), as well as metadata beyond describing APIs (e.g., see lines 2 through 9), and such metadata can be used by transforms. For example lines 6 and 7 offer protocols, and a transform might select to use either a "Web Service" protocol or a "REST" protocol, depending on integration considerations.

TABLE 2

Sample metadata for "Scheduler"

| Line No. | Sample Metadata |
|---|---|
| 1 | <CustomApp> |
| 2 | <Name >Scheduler</Name > |
| 3 | <Vendor> Abcd.com </Vendor> |
| 4 | <Version> 10.2 </Version> |
| 5 | <Protocols> |
| 6 | <Protocol> REST </Protocol> |
| 7 | <Protocol> UNIX-SCRIPT-CMDLINE </Protocol> |
| 8 | </Protocols> |
| 9 | <APIList> |
| 10 | <API> |
| 11 | <CreateSchedule> <!-XML Schema of the API --> </CreateSchedule > |
| 12 | </API> |
| 13 | <API> |
| 14 | <InviteUser> <!-XML Schema of the API --> </ InviteUser > |
| 15 | </API> |
| 16 | </APIList> |
| 17 | </CustomApp> |

Figure 3A:
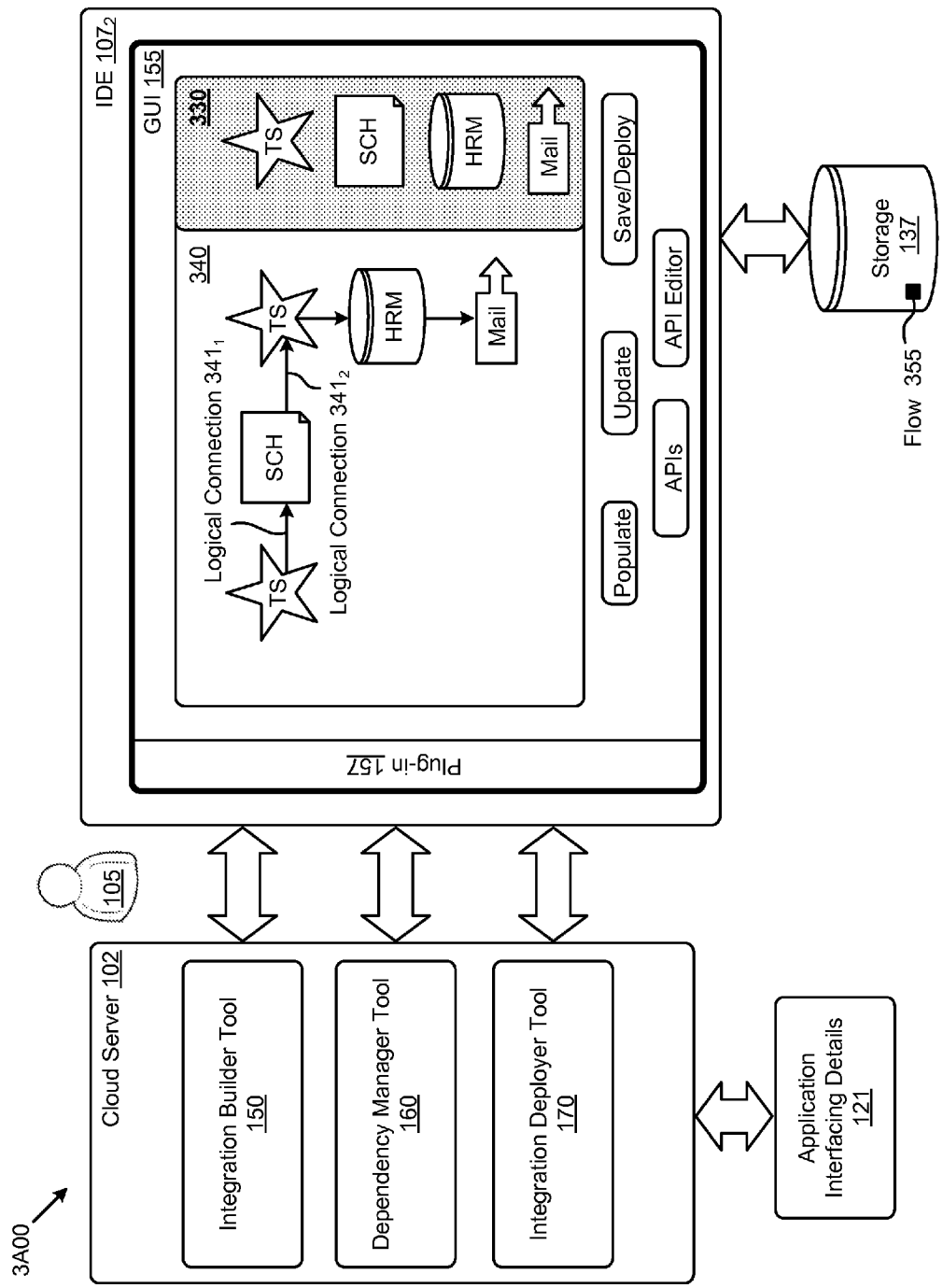
FIG. 3A shows a widget-based graphical user interface use model as used in conjunction with an inter-application transform builder for cloud applications, according to some embodiments.

As can be appreciated, metadata can be used to describe aspects of transforms 153, and the metadata can be saved as stored transforms 205 into a persistent storage repository (e.g., storage 137). More particularly, metadata can be used to describe choices of transforms, which choices might be selected at runtime when data is received from or sent to another application. Further, metadata corresponding to a conduit (e.g., conduit A1T 252, conduit TA2 254, conduit A2T 258, conduit TA1 256, etc.) can be saved as stored transforms 205 into a persistent storage repository FIG. 3A shows a widget-based graphical user interface use model 3A00 as used in conjunction with an inter-application transform builder for cloud applications. As an option, the present widget-based graphical user interface use model 3A00 or any aspect thereof may be implemented in the context of the architecture and functionality of the embodiments described herein. Also, the widget-based graphical user interface use model 3A00 or any aspect thereof may be implemented in any desired environment.

The embodiment of FIG. 3A depicts a portion of a cloud environment 100, within which cloud environment a widget-based graphical user interface use model can be practiced for building cloud applications. The shown IDE $107_2$ or components thereto are provided by the cloud vendor. The shown IDE or components thereto can connect to a cloud server 102, and functions within the cloud server serve to identify the applications that the customer has purchased or otherwise has access to. For each application available, the IDE retrieves any published control widgets as code or metadata (e.g., an XML file) from persistent storage accessible to the cloud infrastructure. Such widgets might be provided by the software application vendors.

In this example, the control widgets include a widget for "TS", a control widget for "SCH", a control widget for "HRM", and a control widget for "Mail". The control widgets can be accessed and cached by the IDE, or they can be updated on-demand or automatically in accordance with a rule or rules, and/or in any manner as per a user configuration. Strictly as one example, the controls offer the following options for developers:

Choice or selection of web services.
Choice or selection of REST APIs.
Choice or selection of socket-based access.
Specification of custom in-memory calls.
Choice or selection of additional protocol support.

A sample application integration build using the IDE $107_2$ is now discussed.

Custom Application Build Based on Inter-Application Control Widgets

For illustrative purposes, the functions of a sample application can be outlined in the following five steps:

1) Call "Talent Scout" to search for candidates with skill set="Java, CRM, Web Services".
2) Select a candidate from the GUI and retrieve the candidate's details (e.g., phone number in order to contact the selected candidate).
3) Call "Scheduler" to find available interviewers.
4) Transform the xml element candidate to xml element party in order to conform to the input format used by "Scheduler".
5) Call the API CreateSchedule in "Scheduler".

Continuing this example, the five-step sample can be built using the widget-based graphical user interface 3A00 by dragging a graphical object descriptor (e.g., graphical widget "TS") from widget pane 330 to the build desktop 340. In doing so, a control object descriptor (e.g., the control widget corresponding to the graphical widget) is retrieved and parsed. Table 3 gives an example of a control widget for "TS" as codified in XML.

TABLE 3

Sample control object descriptor XML for "TS"

| Line No. | Sample Code |
|---|---|
| 1 | <CustomApp> |
| 2 | <Name>Talent Scount</Name> |
| 3 | <Vendor> Acme.com </Vendor> |
| 4 | <Version> 2.4 </Version> |
| 5 | <Protocols> |
| 6 | <Protocol > Web Service </Protocol> |
| 7 | <Protocol> REST </Protocol> |
| 8 | <Protocol> UNIX-SCRIPT-CMDLINE </Protocol> |
| 9 | </Protocols> |
| 10 | <APIList> |
| 11 | <API> |
| 12 | <SearchCandidates> |
| 13 | <Request> |
| 14 | <SearchFilter type="String"> </SearchFilter> # Example: "Name like 'john*' and skill in (java,xml) and experience >= 3 Yrs" |
| 15 | <ResultLimit type="integer"> </ResultLimit> |
| 16 | <IgnoreInactiveCandidates type="boolean"> </IgnoreInactiveCandidates> |
| 17 | <Request> |
| 18 | <Result> |
| 19 | <Candidates> |
| 20 | <Candidate> |
| 21 | <CandidateId type ="int"/> |
| 22 | <CandidateName type="string"/> |
| 23 | </Candidate> |
| 24 | </Candidates> |
| 25 | </Result> |
| 26 | </SearchCandidates> |
| 27 | </API> |
| | <API> |
| 28 | <GetCandidateDetails> |
| 29 | <Request> |
| 30 | <CandidateId type="int"> |
| 31 | <Request> |
| 32 | <Response> |
| 33 | <Candidate> |
| 34 | <CandidateId type ="int"/> |
| 35 | <CandidateName type="string"/> |
| 36 | <Skills type="string"/> |
| 37 | <Experience type="int"/> |
| 38 | <CurrentEmployer type="string"/> |
| 39 | <Compensation type="int"/> |
| 40 | </Candidate> |
| 41 | </Candidate> |

TABLE 3-continued

Sample control object descriptor XML for "TS"

| Line No. | Sample Code |
|---|---|
| 42 | </Response> |
| 43 | </GetCandidateDetails > |
| 44 | </API> |
| 45 | </APIList> |
| 46 | </CustomApp> |

The function of step 2 is specified in line 28 through line 43 of Table 3.

Next, step 3 is implemented by dragging the graphical widget "SCH" from widget pane 330 to the build desktop 340. In doing so, the control widget corresponding to the graphical widget is retrieved (e.g., using a plug-in 157) and the control widget is parsed. In some situations, a dragged widget can be dropped onto build desktop 340 in general proximity to another widget that already appears on the build desktop. Two proximal widgets can be logically connected in a source to target a relationship when the sense of the request of the target widget (as determined by parsing the target widget) is deemed to be structurally similar to the response of the source widget (as determined by parsing the source widget). Also, if a transformer is involved, then the response of the first widget is to match the input to the transformer and the output of the transformer is to match the request of the target widget. A request of a widget and a response of a widget are deemed to be structurally similar if they contain the same data structures or data types (though the names can be different).

Table 4 give an example of a control widget for "SCH" as codified in XML.

TABLE 4

Sample control widget XML for "SCH"

| Line No. | Sample Code |
|---|---|
| 1 | <CustomApp> |
| 2 | <Name>Scheduler</Name> |
| 3 | <Vendor> Abcd.com </Vendor> |
| 4 | <Version> 10.2 </Version> |
| 5 | <Protocols> |
| 6 | <Protocol> REST </Protocol> |
| 7 | <Protocol> UNIX-SCRIPT-CMDLINE </Protocol> |
| 8 | </Protocols> |
| 9 | <APIList> |
| 10 | <API> |
| 11 | <GetAvailableInterviewers> |
| 12 | <Request> |
| 13 | <StartTime type="datetime"/> |
| 14 | <endtime type="datetime"/> |
| 15 | <skills type="string"/> |
| 16 | <group type="string"/> |
| 17 | </Request> |
| 18 | <Response> |
| 19 | <Interviewers> |
| 20 | <Interviewer> |
| 21 | <InterviewerId type="int"> |
| 22 | <InterviewerName type="String"/> |
| 23 | <Skills type="String"/> |
| 24 | <Group type="String/> |
| 25 | </ Interviewer> |
| 26 | </Interviewers> |
| 27 | </Response> |
| 28 | </ GetAvailableInterviewers > |
| 29 | </API> |
| 30 | <API> |
| 31 | <CreateSchedule> |
| 32 | <Request> |
| 33 | <Party> |

TABLE 4-continued

Sample control widget XML for "SCH"

| Line No. | Sample Code |
|---|---|
| 34 | <PartyName type="String"> |
| 35 | <Skills type="string"> |
| 36 | </Party> |
| 37 | <Interviewers> |
| 38 | <Interviewer> |
| 39 | <InterviewerId type="int"> |
| 40 | </Interviewer> |
| 41 | </Interviewers> |
| 42 | </Request> |
| 43 | <Response> |
| 44 | <Schedule> |
| 45 | <Slot> |
| 46 | <Party> |
| 47 | <Interviewer> |
| 48 | <Starttime> |
| 49 | <Endtime> |
| 50 | </Slot> |
| 51 | </Schedule> |
| 52 | <Response> |
| 53 | </ CreateSchedule > |
| 54 | </API> |
| 55 | <API> |
| 56 | <InviteUser> <!-XML Schema of the API --> </ InviteUser > |
| 57 | </API> |
| 58 | </APIList></CustomApp> |

The function to "find out available interviewers" of the sample application (pertaining to step 3) is specified in the API calls given in line 10 through line 58 of Table 4.

The remaining steps of the sample application are implemented by repeating the drag-and-drop operations. In some cases, a step might demand calls to procedures to transform data elements from one application to another. For example, the candidate XML element can be translated to XML element party in order to conform to the input format used by "Scheduler". This can be accomplished in a variety of ways, possibly including use of XSLT.

In some embodiments, graphical screen devices (e.g., buttons) might be provided in the GUI 155. As shown, the GUI includes buttons labeled, "Populate", "Update", "Save/Deploy", "APIs", and "API Editor". The "Populate" button might offer the user a choice of locations from which to populate the graphical widgets showing in widget pane 330. The "Update" button might update all graphical widgets and control widgets found in the current context of GUI 155. A "Save/Deploy" button might store the sample integrated application into executable instance $E_1$ 126 and might further communicate with cloud server processes (e.g., integration deployer tool 170, dependency manager tool 160, integration builder tool 150, etc.) to deploy the integrated application to the cloud infrastructure after tallying the dependencies of the flow of the integrated application. In some cases, a flow corresponding to the juxtaposition and connections of the graphic widgets in the build desktop 340 (e.g., logical connection $341_1$, logical connection $341_2$, etc.) are saved as a flow 355 (e.g., saved in storage 137). Such a flow 355 can be retrieved by an integration builder tool 150. The integration builder tool can apply a mapping to retrieve the control widget corresponding to a graphical widget, and organize the control widgets to provide conduits and transforms (e.g., as discussed in FIG. 2B).

The "APIs" button and the "API Editor" buttons serve to bring up API information in a GUI. Such a GUI is briefly discussed below.

Figure 3B:
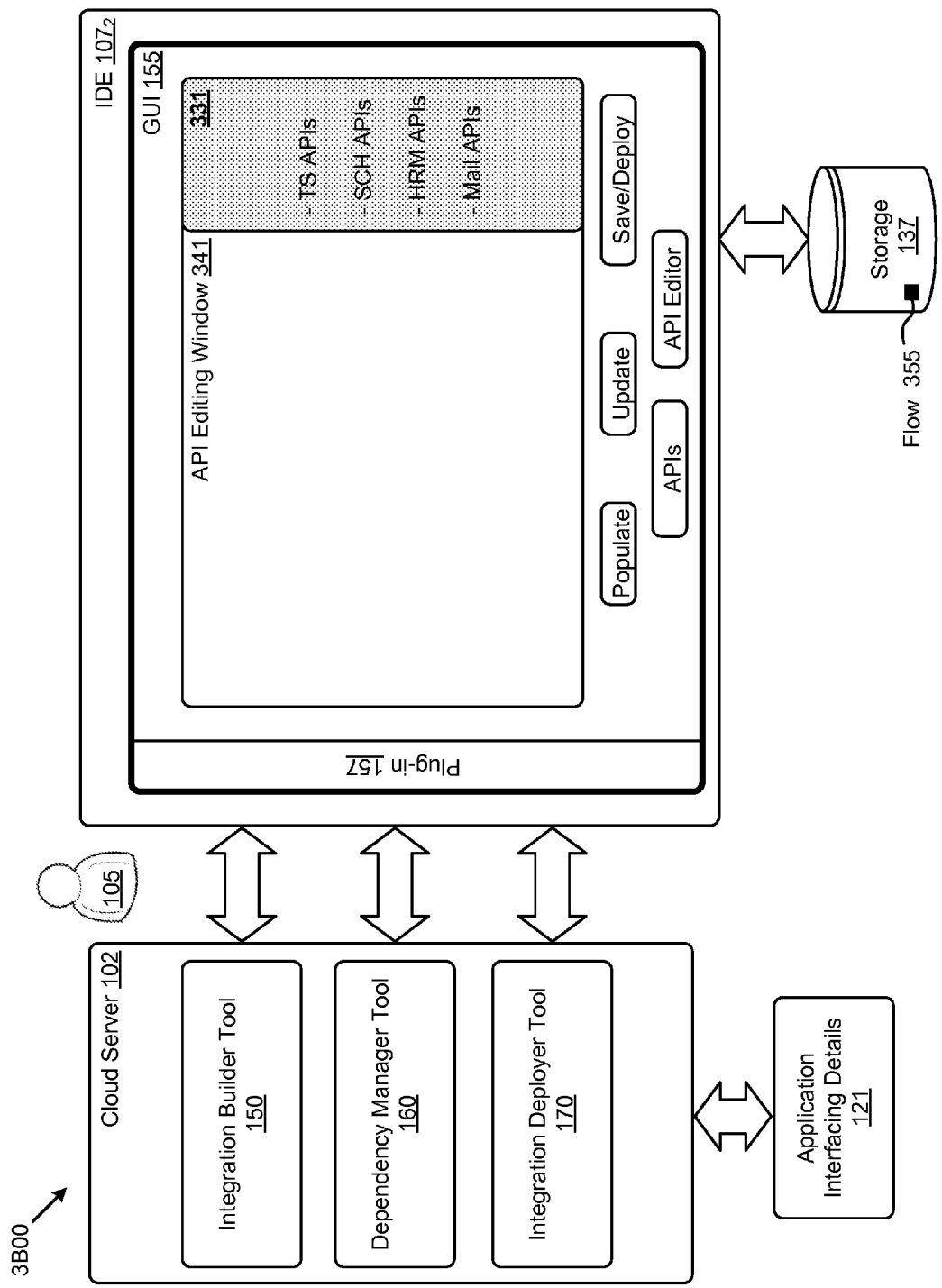
FIG. 3B shows a text-based graphical user interface use model as used in conjunction with an inter-application transform builder for cloud applications, according to some embodiments.

FIG. 3B shows a text-based graphical user interface use model 3B00 as used in conjunction with an inter-application transform builder for cloud applications. As an option, the present text-based graphical user interface use model 3B00 or any aspect thereof may be implemented in the context of the architecture and functionality of the embodiments described herein. Also, the text-based graphical user interface use model 3B00 or any aspect thereof may be implemented in any desired environment.

As shown, the GUI 155 comprises an API reading pane 331 and an API editing window 341. A list of APIs pertinent to the current context is displayed within an API reading pane 331, possibly in a scrolling region. A selected one of the APIs pertinent to the current context (e.g., selected from the API reading pane 331) is displayed for editing in the API editing window 341.

Using the text-based graphical user interface use model 3B00 or the widget-based graphical user interface 3A00, either singly or in combination, an integrated application can be developed. Then the integrated application can be saved to storage (e.g., storage 137) and deployed to the cloud infrastructure.

Returning to the discussion of FIG. 1, the integration deployer tool 170 serves to load the sample application to the cloud. In doing so, the integration deployer tool constructs the needed conduit and transforms (see FIG. 2A and FIG. 2B) using the control widget descriptions. More specifically, the integration deployer tool fills in the runtime details of the newly integrated application in order for the integrated application to execute in the cloud.

Ongoing Maintenance

A base application (e.g., App1, App2) might be updated by the software vendor. Such an update might not necessarily need to affect the sample application. As an example, suppose that some few weeks after the deployment of the sample application, the "Mail" application is enhanced to begin using SSL for mail transport. In this case, the integrated application can be automatically redeployed by merely adding SSL credentials and details to the "Mail" section of all referencing applications.

In exemplary embodiments, the determination of referencing applications can be performed by a dependency manager tool 160. Continuing with the example of adding SSL, all referencing applications can be updated by merely adding SSL credentials and details to the "Mail" section of the "Mail" control widget. Further, the dependency manager tool maintains inventory of applications that use a given a custom application. As depicted in FIG. 1 a dependency manager tool 160 runs on a cloud server. The dependency manager tool can be run as a background process that continuously monitors changes to the cloud infrastructure.

In a case such as earlier described, a base application (e.g., App1, App2) might be updated by the software vendor. Then, using the interconnection of a second application to the base application the dependency manager tool 160 fills in the runtime details of the application interconnections and inter-relationships in order for it to successfully execute in the cloud. Strictly as an example, if the Mail application enforces SSL for mail transport, the application is automatically redeployed by the dependency manager by adding SSL credentials and details to the Mail section of all referencing applications. Further, the dependency manager maintains inventory of applications that use a given application.

Figure 4:
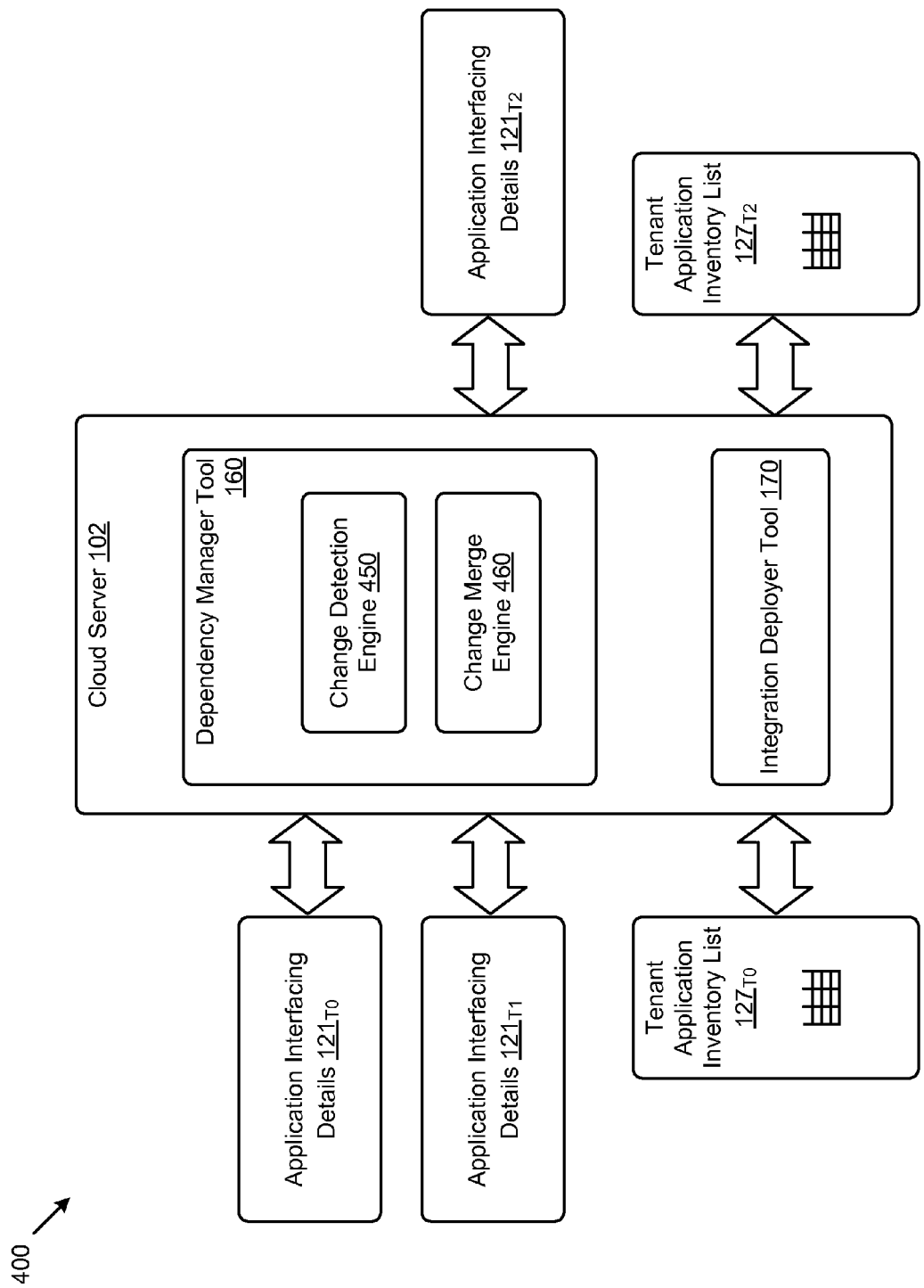
FIG. 4 is a schematic diagram of a dependency manager flow as used in conjunction with an inter-application transform builder for cloud applications, according to some embodiments.

A sample flow using a dependency manager tool is discussed in FIG. 4.

FIG. 4 is a schematic diagram of a dependency manager flow 400 as used in conjunction with an inter-application transform builder for cloud applications. As an option, the present dependency manager flow 400 or any aspect thereof may be implemented in the context of the architecture and functionality of the embodiments described herein. Also, the dependency manager flow 400 or any aspect thereof may be implemented in any desired environment.

As shown, a dependency manager tool 160 is a process executing within a cloud server 102. The depicted dependency manager tool is partitioned into a change detection engine 450 and a change merge engine 460. The change detection engine and change merge engine can cooperate so as to detect changes found across two (or more) versions of data comprising application interfacing details. For example, application interfacing details $121_{T0}$ might be compared against application interfacing details $121_{T1}$. In the event that changes are detected, then a change merge engine can be employed to merge changes into an output data element such as application interfacing details $121_{T2}$.

The cloud server might also comprise an integration deployer tool 170, which can interoperate cooperatively with other elements of the system. For example, integration deployer tool 170 can be configured to manage the relationships between an integrated application and its constituent application components.

TABLE 5

Dependency manager tool inventory relation

| Integrated Application | TargetAppId | SrcVersion | TargetVersion |
|---|---|---|---|
| RecruitApp | Mail | 1.0 | 2.5 |
| RecruitApp | TalentScout | 1.0 | 2.6 |
| RecruitApp | Scheduler | 1.0 | 10.3 |
| RecruitApp | HRM | 1.0 | 11 g |

As earlier indicated, the rate at which software vendors release patches and/or code updates has increased dramatically, thus a process in the cloud (e.g., within cloud server 102) can serve to perform a periodic assessment of additions to the application inventory list and/or changes to the application interfacing details. In some cases detected changes can be automatically applied; in other cases detected changes can precipitate manual intervention.

As shown, the integration deployer 170 retrieves a tenant application inventory list from some moment in time "T0", (e.g., see tenant application inventory list $127_{T0}$) and update the list to create an updated version (e.g., tenant application inventory list $127_{T2}$).

Additional Embodiments of the Disclosure

Practical Applications

Figure 5:
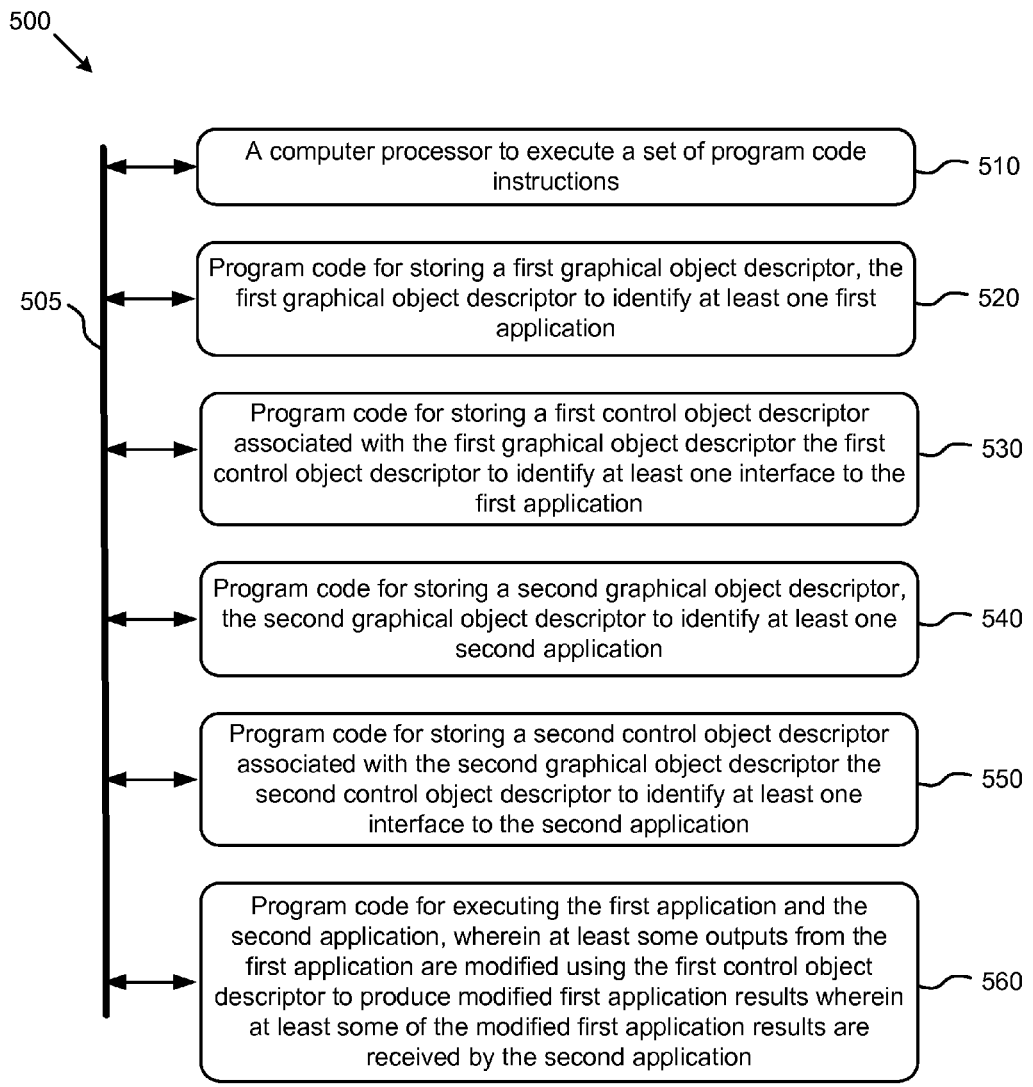
FIG. 5 is a block diagram of a system for implementing an inter-application transform builder for cloud applications, according to some embodiments.

FIG. 5 is a block diagram of a system for implementing an inter-application transform builder for cloud applications. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: storing a first graphical object descriptor, the first graphical object descriptor to identify at least one first application (see module 520); storing a first control object descriptor associated with the first graphical object descriptor the first control object descriptor to identify at least one interface to the first application (see module 530); storing a second graphical object descriptor, the second graphical object descriptor to identify at least one second application (see module 540); storing a second control object descriptor associated with the second graphical object descriptor the second control object descriptor to identify at least one interface to the second application (see module 550); executing the first application and the second application on a computer at a first time, wherein at least some outputs from the first application are processed using the first control object descriptor to produce first application results and at least some of the first application results are received by the second application (see module 560). Some embodiments proceed to modify a behavior of the first application, then executing the modified first application and the second application at a second time, wherein at least some outputs from the modified first application are processed using the first control object descriptor to produce modified first application results; and wherein at least some of the modified first application results are received by the second application.

Figure 6:
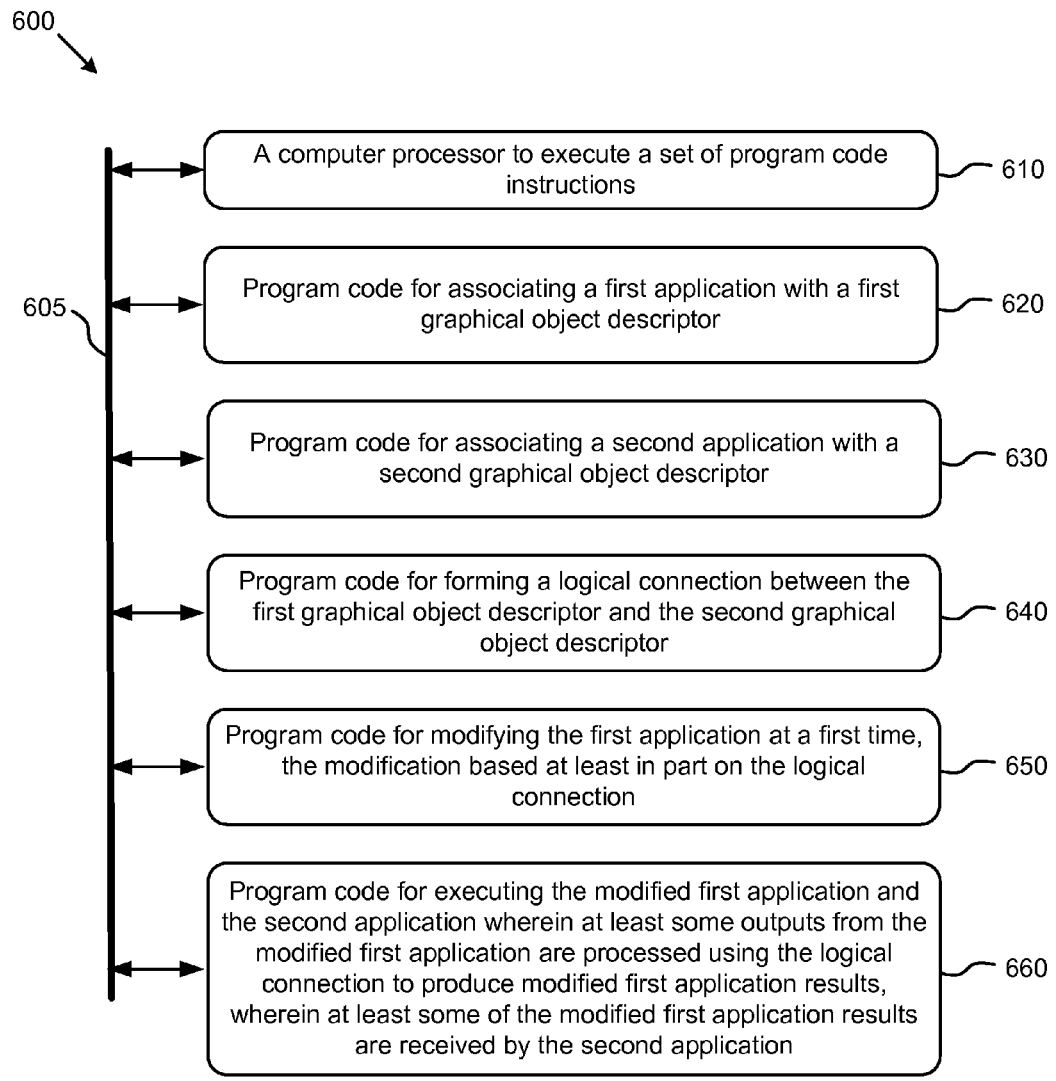
FIG. 6 is a block diagram of a system for implementing an inter-application transform builder for cloud applications, according to some embodiments.

FIG. 6 is a block diagram of a system for implementing an inter-application transform builder for cloud applications, according to some embodiments. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: associating a first application with a first graphical object descriptor (see module 620); associating a second application with a second graphical object descriptor (see module 630); forming a logical connection between the first graphical object descriptor and the second graphical object descriptor (see module 640); modifying a behavior of the first application, the modification based at least in part on the logical connection (see module 650); and executing, in a processor, the modified first application wherein at least some outputs from the modified first application are processed using the logical connection to produce modified first application results (see module 660).

System Architecture Overview

Additional Practical Applications

Figure 7:
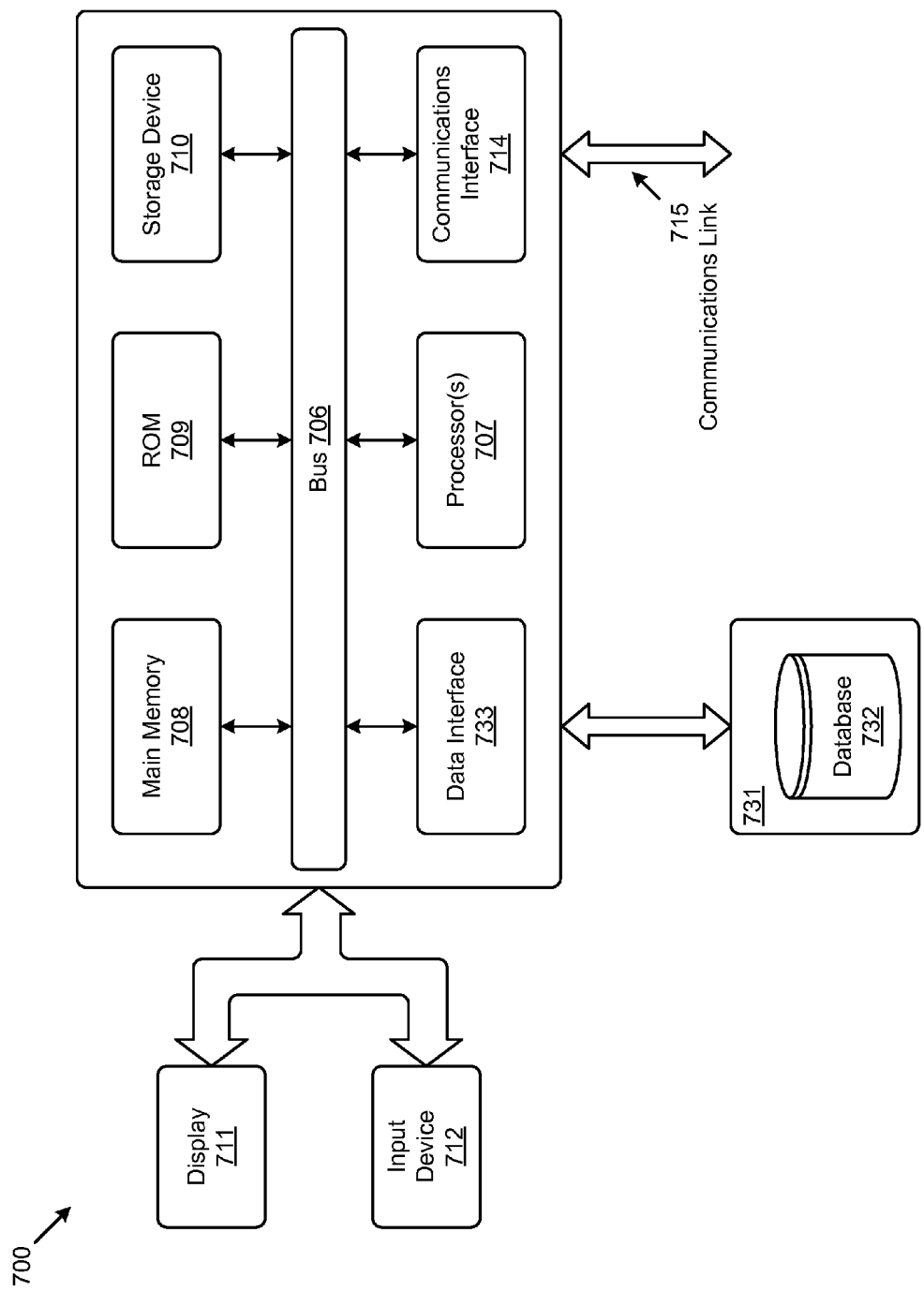
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
associating a first application with a first graphical object descriptor and a second application with a second graphical object descriptor, the first graphical object descriptor and the second graphical object descriptor not being stored within a same software object;
forming a logical connection between the first graphical object descriptor and the second graphical object descriptor;
determining a source-target relation between the first and second graphical object descriptors based in part or in whole upon structural characteristics of the first and second graphical object descriptors;
inserting a transform along the logical connection between the first and second graphic descriptors based in part or in whole upon the source-target relation and a data type or a data structure transmitted via the logical connection, the transform transforming at least a portion of an output by the first application to become accessible by the second application;
establishing a communication between the first and second applications at least by modifying a behavior of the first application with the transform inserted along the logical connection between the first and second graphic descriptors based at least in part on the logical connection such that the at least the portion of the output of the first application is transformed into a modified format accessible by the second application;
identifying a change, which affects the communication, in the first application, the second application, or both the first and second applications after the communication has been established; and
maintaining the communication at least by modifying the behavior of the first application or a behavior of the second application so that the communication between the first and second applications is preserved.

2. The method of claim 1, further comprising forming an association between the first graphical object descriptor and a first control object descriptor or forming an association between the second graphical object descriptor and a second control object descriptor.

3. The method of claim 2 wherein the first control object descriptor defines at least one of, a protocol, a version, an application programming interface, or a data element.

4. The method of claim 1, further comprising:
generating a first structural characteristic of a response portion of the first graphic descriptor and a second structural characteristic of a sense portion of the second graphic descriptor based in part or in whole upon the source-target relation;
determining one or more control widgets based in part or in whole upon the first structural characteristic and the second structural characteristic; and
determining a transform for the first and second graphic descriptors based in part or in whole upon the one or more control widgets.

5. The method of claim 4, further comprising constructing a transformation with at least information stored in the first or second graphical object descriptor and providing how the transformation is to be constructed for the first application or the second application.

6. The method of claim 1, wherein the first graphical object descriptor is an integrated development environment widget.

7. The method of claim 1, wherein modifying the first application comprises applying one or more patches to the first application.

8. The method of claim 1, further comprising performing a periodic assessment of an applications inventory list, wherein the applications inventory list comprises a list of one or more applications integrated with other applications.

9. The method of claim 1, further comprising performing a periodic assessment of application interfacing details.

10. A computer program product embodied in a non-transitory computer readable medium, the computer readable medium having stored thereon a sequence of instructions which, when executed by a processor causes the processor to execute a process, the process comprising:
associating a first application with a first graphical object descriptor and a second application with a second graphical object descriptor, the first graphical object descriptor and the second graphical object descriptor not being stored within a same software object;
forming a logical connection between the first graphical object descriptor and the second graphical object descriptor;
determining a source-target relation between the first and second graphical object descriptors based in part or in whole upon structural characteristics of the first and second graphical object descriptors;
inserting a transform along the logical connection between the first and second graphic descriptors based in part or in whole upon the source-target relation and a data type or a data structure transmitted via the logical connection, the transform transforming at least a portion of an output by the first application to become accessible by the second application;
establishing communication between the first and second applications at least by modifying a behavior of the first application with the transform inserted along the logical connection between the first and second graphic descriptors based at least in part on the logical connection such that the at least the portion of the output of the first application is transformed into a modified format accessible by the second application;
identifying a change, which affects the communication, in the first application, the second application, or both the first and second applications after the communication has been established; and
maintaining the communication at least by modifying the behavior of the first application or a behavior of the second application so that the communication between the first and second applications is preserved.

11. The computer program product of claim 10, further comprising instructions for forming an association between the first graphical object descriptor and a first control object descriptor or forming an association between the second graphical object descriptor and a second control object descriptor.

12. The computer program product of claim 11 wherein the first control object descriptor defines at least one of, a protocol, a version, an application programming interface, or a data element.

13. The computer program product of claim 10, further comprising:
generating a first structural characteristic of a response portion of the first graphic descriptor and a second characteristic of a sense portion of the second graphic descriptor based in part or in whole upon the source-target relation;
determining one or more control widget based in part or in whole upon the first characteristic and the second characteristic; and
determining a transform for the first and second graphic descriptor based in part or in whole upon the one or more control widget.

14. The computer program product of claim 13 wherein the second control object descriptor defines at least one of, a protocol, a version, an application programming interface, or a data element.

15. The computer program product of claim 10, wherein the first graphical object descriptor is an integrated development environment widget.

16. The computer program product of claim 10, wherein modifying the first application comprises applying one or more patches to the first application.

17. The computer program product of claim 10, further comprising instructions for performing a periodic assessment of an applications inventory list, wherein the applications inventory list comprises a list of one or more applications integrated with other applications.

18. The computer program product of claim 10, further comprising instructions for performing a periodic assessment of application interfacing details.

19. A computer system comprising:
a first memory area to associate a first application with a first graphical object descriptor and to associate a second application with a second graphical object descriptor and a second application with a second graphical object descriptor;
a second memory area used to form a logical connection between the first graphical object descriptor and the second graphical object descriptor, the first graphical object descriptor and the second graphical object descriptor not being stored within a same software object;
a relation determination memory area used to determine a source-target relation between the first and second graphical object descriptors based in part or in whole upon structural characteristics of the first and second graphical object descriptors;
a transform insertion memory area used to insert a transform along the logical connection between the first and second graphic descriptors based in part or in whole upon the source-target relation and a data type or a data structure transmitted via the logical connection, the transform transforming at least a portion of an output by the first application to become accessible by the second application;
a third memory area to hold memory values pertaining to establishing a communication between the first and second applications at least by modifying a behavior of the first application with the transform inserted along the logical connection between the first and second graphic descriptors based at least in part on the logical connection such that the at least the portion of the output of the first application is transformed into a modified format of the first application based at least in part on the logical connection;
a fourth memory area used to identify a change, which affects the communication, in the first application, the second application, or both the first and the second applications after the communication has been established;
a fifth memory area used to maintain the communication at least by modifying the behavior of the first application or a behavior of the second application so that the communication between the first and second applications is preserved; and
a processor to execute the first application with the modified behavior such that the first format of the at least the portion of the first application is modified into the modified format accessible the second application.

20. The computer system of claim 19, further comprising a second application to receive at least some of the outputs of the modified first application.

* * * * *